United States Patent [19]
Brotz

[11] Patent Number: 5,553,715
[45] Date of Patent: Sep. 10, 1996

[54] BICYCLE STAND

[76] Inventor: Gregory R. Brotz, P.O. Box 1322, Sheboygan, Wis. 53081

[21] Appl. No.: 391,987

[22] Filed: Feb. 21, 1995

[51] Int. Cl.⁶ ................................................. A47F 7/00
[52] U.S. Cl. ........................... 211/5; 211/17; 248/551; 70/58
[58] Field of Search ............................ 211/5, 4, 17, 22, 211/1.3; 70/58; 248/551, 552

[56] References Cited

U.S. PATENT DOCUMENTS

| 606,118 | 6/1898 | Bowman | 211/5 |
|---|---|---|---|
| 3,934,436 | 1/1976 | Candlin et al. | 211/5 X |
| 5,301,817 | 4/1994 | Merritt | 211/5 |
| 5,447,241 | 9/1995 | Boreau | 211/5 X |

FOREIGN PATENT DOCUMENTS

| 0582149 | 2/1994 | European Pat. Off. | 211/17 |
|---|---|---|---|
| 8101926 | 11/1982 | Netherlands | 211/5 |
| 2045707 | 11/1980 | United Kingdom | 211/5 |

*Primary Examiner*—Robert W. Gibson, Jr.
*Attorney, Agent, or Firm*—William Nitkin

[57] ABSTRACT

A bicycle stand for supporting a bicycle above the ground having a casing embedded in the ground to which an articulative member is pivotally attached at its first end and a bicycle frame engagement member is disposed at the second end of the articulative member, the bicycle stand in its first mode being pivoted downward to rest within the casing and in its second mode of use being pivoted upwards from the casing with the bicycle frame engagement member engaged to a portion of the bicycle frame.

9 Claims, 5 Drawing Sheets

BICYCLE STAND

BACKGROUND OF THE INVENTION

1. Field of the Invention

The device of this invention resides in the area of bicycle stands and more particularly relates to a bicycle stand unit having an upwardly pivoting articulative member which in use is attached to a bicycle frame and locked thereto by an engagement member with a locking mechanism which articulative member, when not in use, can be repositioned in a cavity in a casing embedded in the ground and locked thereto in a substantially flat relationship to the ground so as not to protrude above the ground level.

2. Description of the Prior Art

Bicycle stands are well known in the prior art which stands usually consist of a plurality of vertically disposed metal racks with openings therein, each to receive a bicycle wheel to support each bicycle in an upright position. Many bicycles can be supported in such bicycle racks, and bicyclists often lock their bicycles to such racks by padlocks and other well-known locking means. Unfortunately such racks require substantial physical space as well as maintenance to repair damage and to prevent rusting. Such bicycle racks are susceptible to vandalism and can be unsightly if covered by graffiti or if allowed to rust.

SUMMARY OF THE INVENTION

It is an object of this invention to provide an improved bicycle stand to be used singly or in a series for support of a bicycle which device, when not in use, can be rotated to a position level with the surface of the ground so as to then form a smooth ground surface.

It is a further object of this invention to provide a bicycle stand which is neat in appearance at all times.

It is a still further object of this invention to provide a bicycle stand which can have locking means associated therewith to lock the device to the bicycle's frame when in use and to a casing in the ground when not in use.

It is a yet further object of this invention to provide a bicycle stand the utilization of which can be limited to those bicyclists to whom a key to the locking mechanism associated with a particular member has been issued.

The bicycle stand of this invention in each of its preferred embodiments consists of an articulative member rotating upward from a pivoting point of attachment, each within its respective cavity formed in a casing in the ground, the articulative member having an engagement member at its opposite end to be engaged around the bicycle frame when in its use mode and when not in use, the articulative member can be rotated downward to rest within its respective casing cavity, each casing cavity having a similar shape and size to its associated articulative member and engagement member to receive them snugly therein so that the upper surfaces of the articulative member and engagement member are disposed substantially at ground level. A locking mechanism can lock the engagement member to the bicycle. When the device is not in use, the articulative member and engagement member can be lowered into the casing cavity and locked therein.

DESCRIPTION OF THE PREFERRED EMBODIMENT(S)

Figure 1:
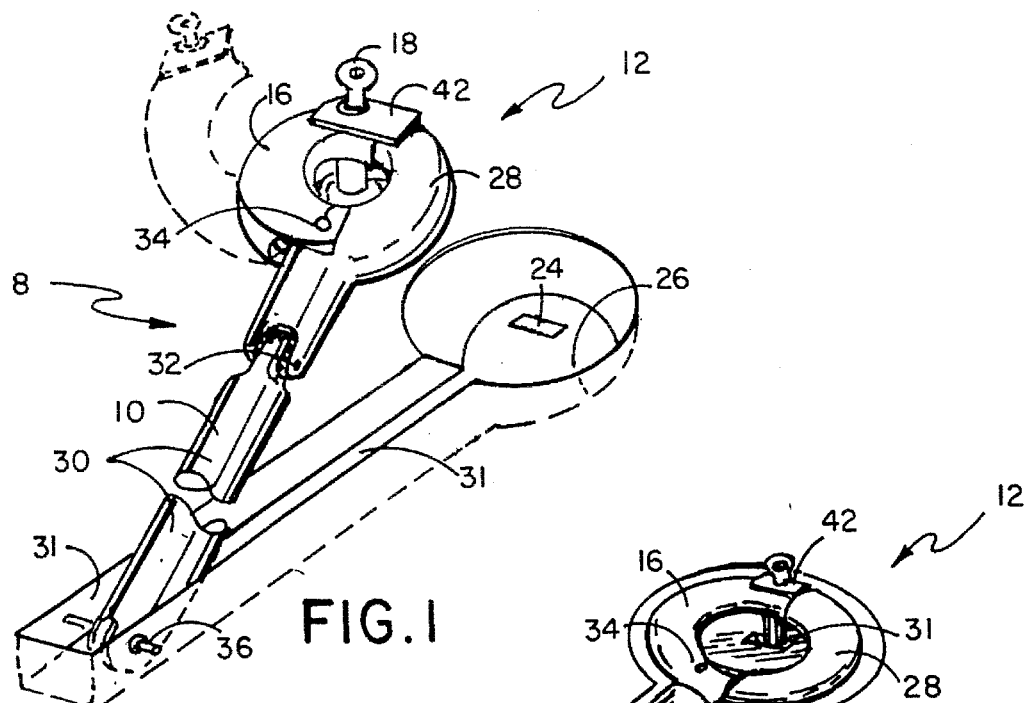
FIG. 1 illustrates a perspective view of the bicycle stand member of this invention positioned above its casing cavity, the upper portion designated by dotted lines showing the engagement member in an open position and with the solid lines showing the engagement member in its closed position.
Figure 2:
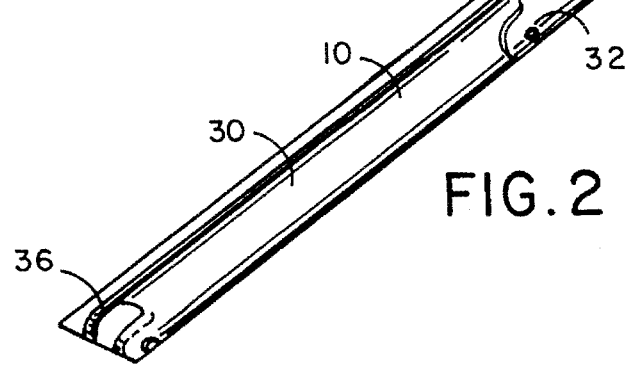
FIG. 2 illustrates a perspective view of the bicycle stand member of this invention in its non-use mode lowered into its casing cavity.
Figure 4:
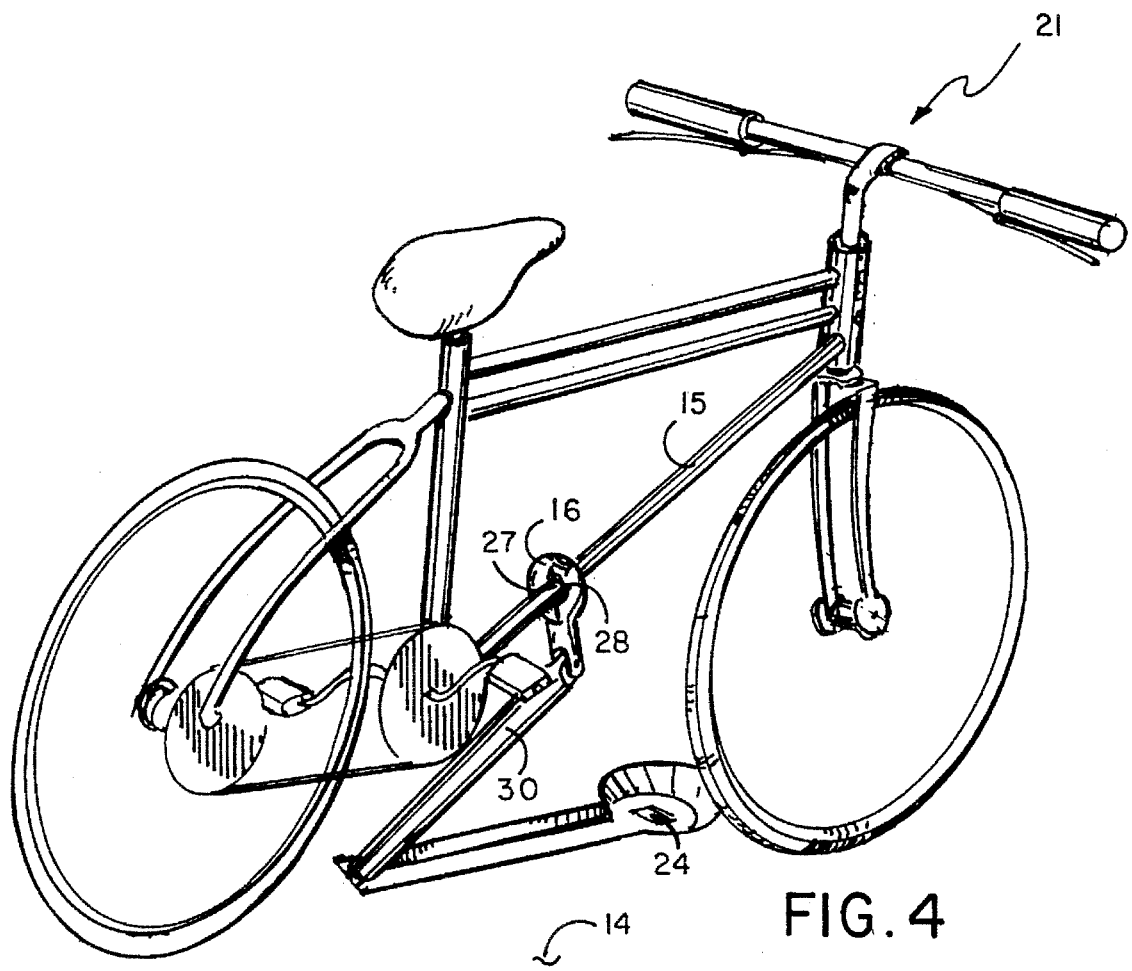
FIG. 4 illustrates the member of this invention engaged to, and supporting, a bicycle frame.
Figure 5:
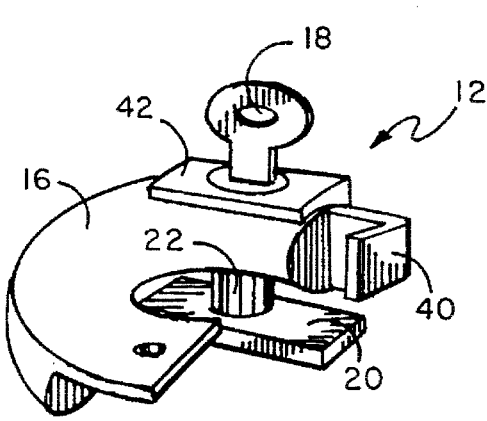
FIG. 5 illustrates a perspective sectional view of the locking mechanism.
Figure 6:
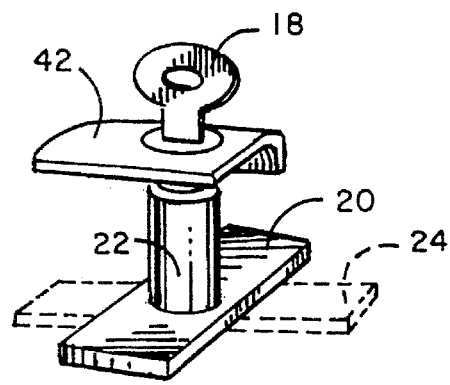
FIG. 6 illustrates a perspective sectional view of the locking mechanism in position to lock the member into its respective casing cavity.
Figure 7:
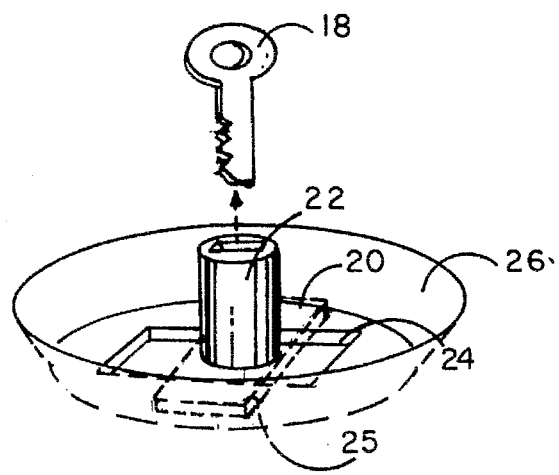
FIG. 7 illustrates a perspective view of the locking mechanism of FIG. 6 which locks the member to the casing after the shaft member has been positioned into its casing cavity to retain the device of this invention securely therein at ground level so that it cannot be lifted up until the locking mechanism is unlocked.

FIG. 1 illustrates device 8 of the bicycle stand of this invention having an articulative member being an elongated shaft member 30 attached at its first end to first pivot member 36 engaged to casing 31 within casing cavity 26. Casing cavity 26 can be of a shape and size that is slightly larger than the shape and size of device 8 to receive device 8 snugly therein. Although the device is illustrated in an elongated lollipop shape, it should be noted that the device can be constructed of different shapes and sizes, Shaft member 10 at its first end is pivotally attached to casing 31 by first pivot 36. Casing 31 which is embedded in the ground and anchored thereto such that the top surface of the device is disposed at ground level when it is not in use. Disposed at the second end of shaft member 30 is second pivot 32 which engages to, and allows, locking portion 12 of the device to be pivoted upwards or downwards independently of shaft 30, as seen in FIG. 4, to be attached to frame member 15 of bicycle 21. Locking portion 12 is comprised of closure member 28 and engagement member 16 which member is pivotally attached at third pivot 34 to closure member 28, and which is locked thereto when supporting and holding the bicycle in an upright position. At the end of engagement member 16 opposite to third pivot 34 is disposed locking mechanism 13 as also illustrated in FIGS. 5, 6 and 7. When the device is to be stored in its casing cavity, locking mechanism 13 is unlocked and engagement member 16 is pivoted laterally at third pivot 34. Locking portion 12 is then disengaged from bicycle frame 15. The device is then pivoted downward into its casing cavity, and locking portion 12 is then locked to casing 31 as described in further detail below. FIG. 1 shows locking portion 12 of the device with its engagement member 16 locked to closure member 28. Depicted in dotted lines to the left thereof is the position of engagement member 16 in its unlocked and swung open position. When the device is to be used to support a bicycle, engagement member 16 of locking portion 12 is swung open so as to leave an open area 27, seen in FIG. 4, into which a frame member of the bicycle can be positioned between engagement member 16 and closure member 28. Engagement member 16 is then manually pivoted at third pivot 34 until engagement catch 40 mates with a mating catch on closure member 28, not illustrated. Key 18 is then turned to lock engagement catch 40 to such mating catch which, as seen in FIG. 5, locks engagement member 16 to closure member 28.

When the device is to be positioned and stored within casing 31, locking mechanism 13 is unlocked, allowing one to release the bicycle frame from the device. Engagement member 16 is then manually pivoted laterally to meet with closure member 28. The device is then lowered by first and second pivot means into casing cavity 26 of casing 31. In casing 31 is an aperture 24 of a size and shape to receive elongated member 20 at the bottom of the locking mechanism. Below aperture 24 is space 25 seen in FIG. 7. When key 18 is turned to lock the device in place within casing 31, the turning of the key causes elongated member 20 to rotate 90 degrees out of alignment with aperture 24, after being passed therethrough, to a position perpendicular thereto, thereby at the same time locking engagement member 16 to closure member 28 and locking device 8 to casing 31 as the rotated elongated member can then not pass back through aperture 24. Other equivalent locking means can be utilized with this invention to lock device 8 to casing 31. The key can then be removed, leaving the device securely retained within casing cavity 26 so that it cannot be inadvertently released therefrom. The device is thereby neatly stored at ground level.

Figure 3:
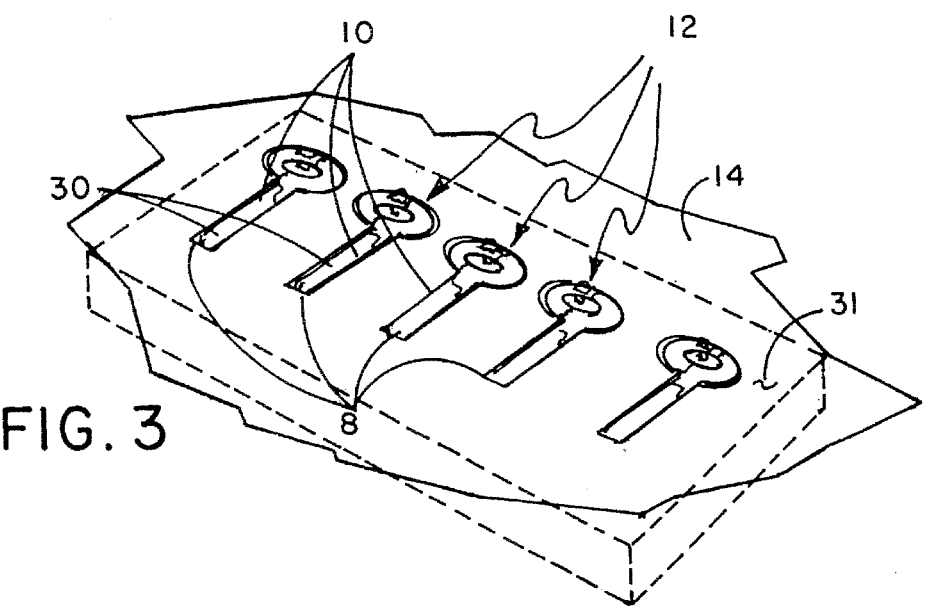
FIG. 3 illustrates a perspective view of a plurality of members of this invention disposed in their respective casing cavities at ground level.

As seen in FIG. 3, a plurality of such devices 8 with their respective locking portions 12 and casing cavities can be provided in a row or desired arrangement within casing 31 designed to hold multiple devices, such casing embedded in ground 14. Casing 31 can be securely embedded in the ground by bolt means engaged to a concrete base or by equivalent means. The articulation of locking portion 12 on second pivot 32 allows the device to be maneuvered to position to be attached to the frame member of bicycles of varied constructions. By utilizing the dual first and second pivots 36 and 32 to move and adjust the position of the device, a portion of the bicycle frame can be positioned in open area 27, as seen in FIG. 4, such that engagement member 16 of the device can be pivoted on third pivot 34 to open locking portion 12 and allow the bicycle frame to be positioned in open area 27. Engagement member 16 is then manually closed, and key 18 is used to lock engagement member 16 in position on the bicycle frame. When one wishes to remove the bicycle from the bicycle stand of this invention, one uses the key to unlock the device to open engagement member 16 and removes the bicycle from locking portion 12. One then returns the device to its casing cavity by downward rotation of both shaft member 30 on first pivot 36 and locking portion 12 on second pivot member 32 until device 8 is flush with ground 14, as seen in FIG. 3. With elongated member 20 aligned with and passing through aperture 24, one then turns key 18 to rotate locking mechanism 13, moving shaft 22 which in turn rotates elongated member 20, which is of a size somewhat smaller than the size of aperture 24, 90 degrees within space 25. Elongated member 20 is then not aligned with aperture 24. The entire device is thus retained in its casing cavity because elongated member 20 cannot pass through aperture 24 until one uses key 18 to rotate elongated member 20 to realign it with aperture 24 to allow elongated member 20 to again pass through aperture 24.

Figure 8:
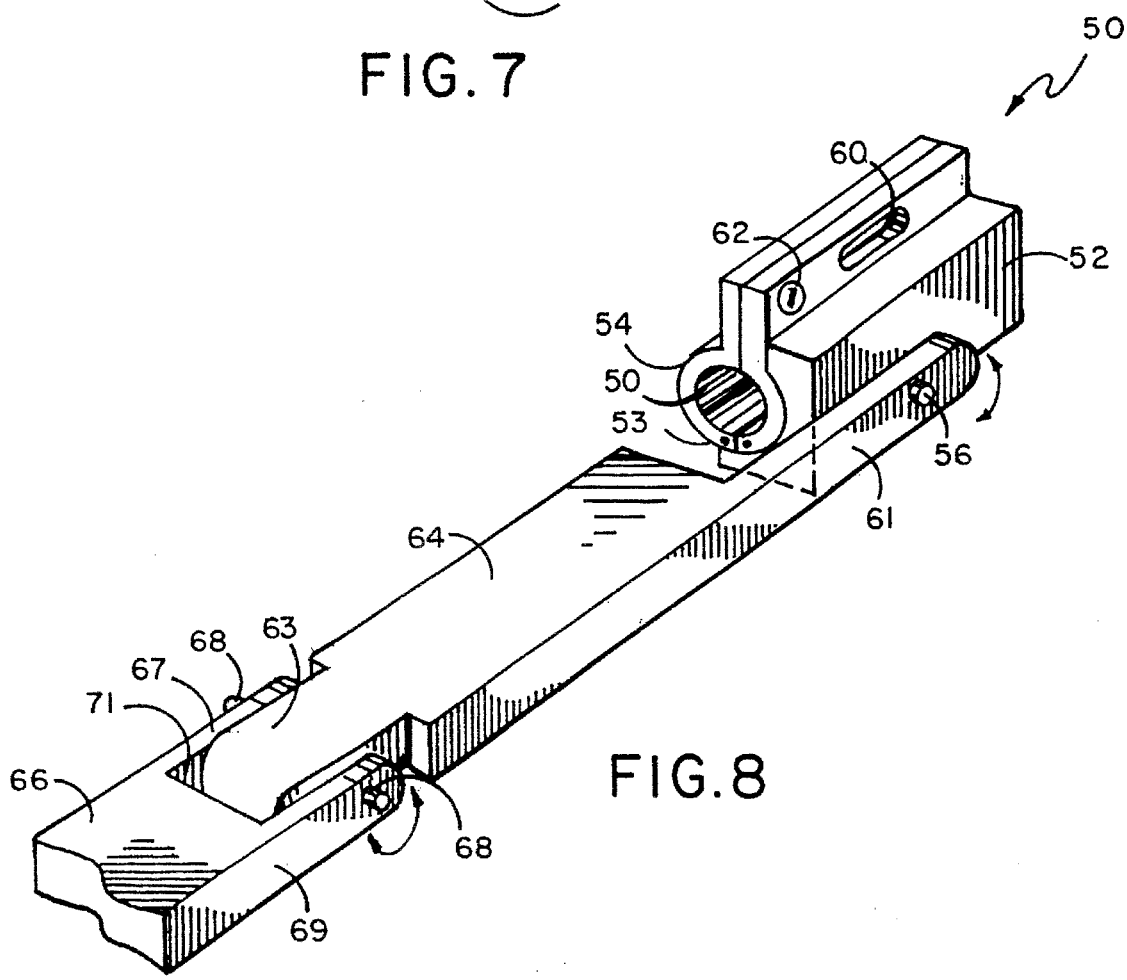
FIG. 8 illustrates a perspective view of an alternate embodiment of the bicycle stand having an elongated locking portion.
Figure 9:
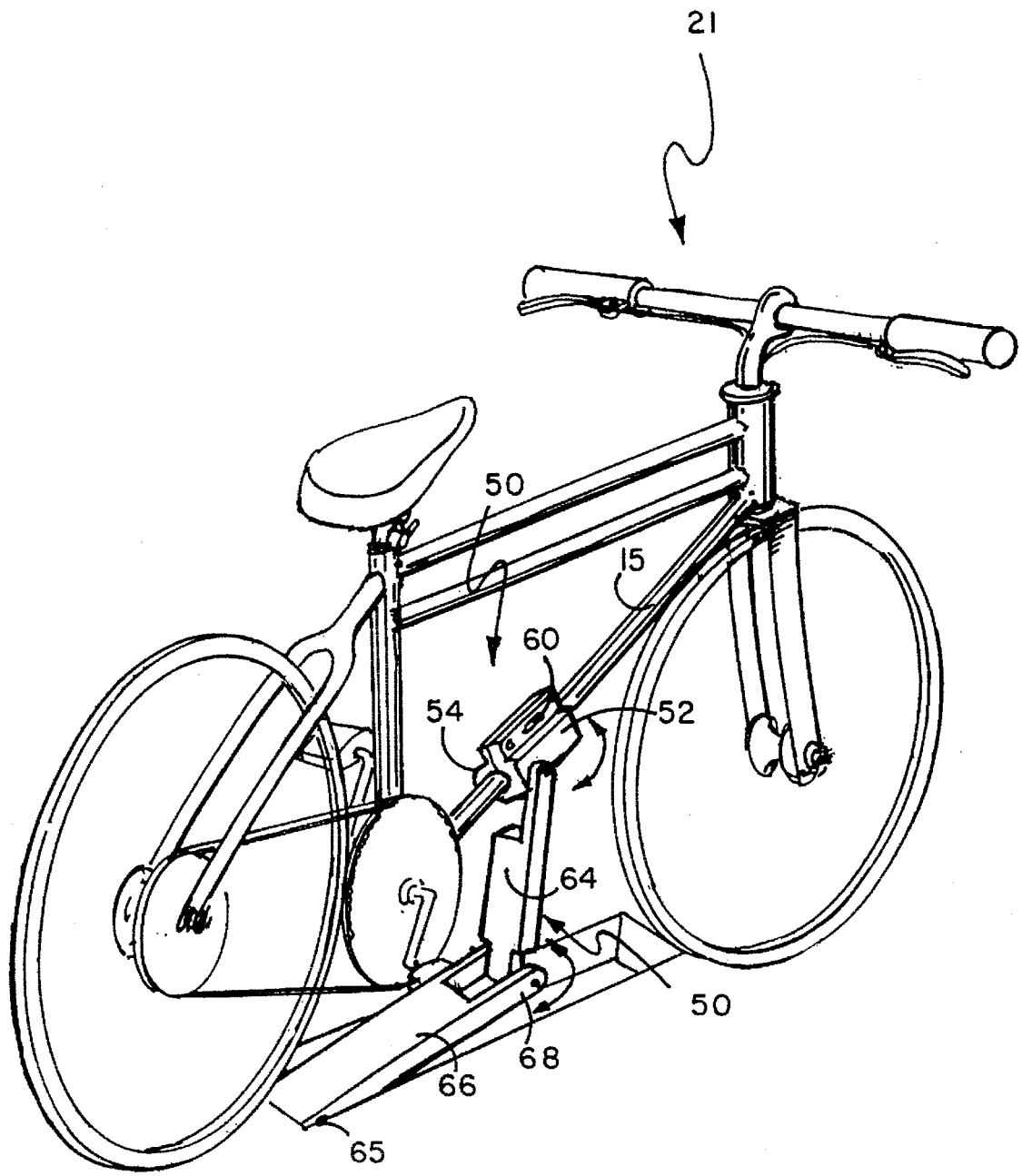
FIG. 9 illustrates a perspective view of the bicycle stand of FIG. 8 showing a bicycle held upright by such elongated locking portion.

FIG. 8 illustrates a perspective view of an alternate embodiment of the device of this invention with an elongated locking portion 50 attached to the articulative member. Arm 66 has a first end and a second end. Arm 66 at its first end, shown cut off in FIG. 8, is pivotally attached as described in prior embodiments to the casing by pivot means, not shown. At its second end are first and second arm extensions 67 and 69 defining an open space 71 therebetween. First end 63 of extension member 64 is disposed within open space 71 and is pivotally attached on each side thereof by pivots 68 to first and second arm extensions 67 and 69. At the second end of extension member 64 is extension member arm 61. Elongated locking portion 50 is pivotally attached to extension member arm 61 at pivot 56. By using elongated locking portion 50, one can, as seen in FIG. 9, engage such locking portion 50 to the bicycle by lifting up arm 66 and bending extension member 64 upwards toward frame 15 of bicycle 21 and then locking elongated locking portion 50 around such frame member by using key lock 62 seen in FIG. 8. In this embodiment bicycle 21 is held upright without the need of using a kickstand because it cannot twist and fall because the angle of frame 15 is such that the elongated locking portion 50 holds it in place. In the embodiment shown, elongated locking portion 50 can have first and second sides 52 and 54 which are pivotally attached by pivot 53 and which can, on pivot 53, open so that open receipt area 58 can receive frame 15 of bicycle 21, as seen in FIG. 9. One then closes second side 54 against first side 52, and one can lock the two sides together either with key lock 62 or by having an aperture 60 defined in the top portion of first and second sides 52 and 54 through which a padlock owned by the user can be passed. In this manner the device can retain bicycle 21 in an upright position.

Figure 10:
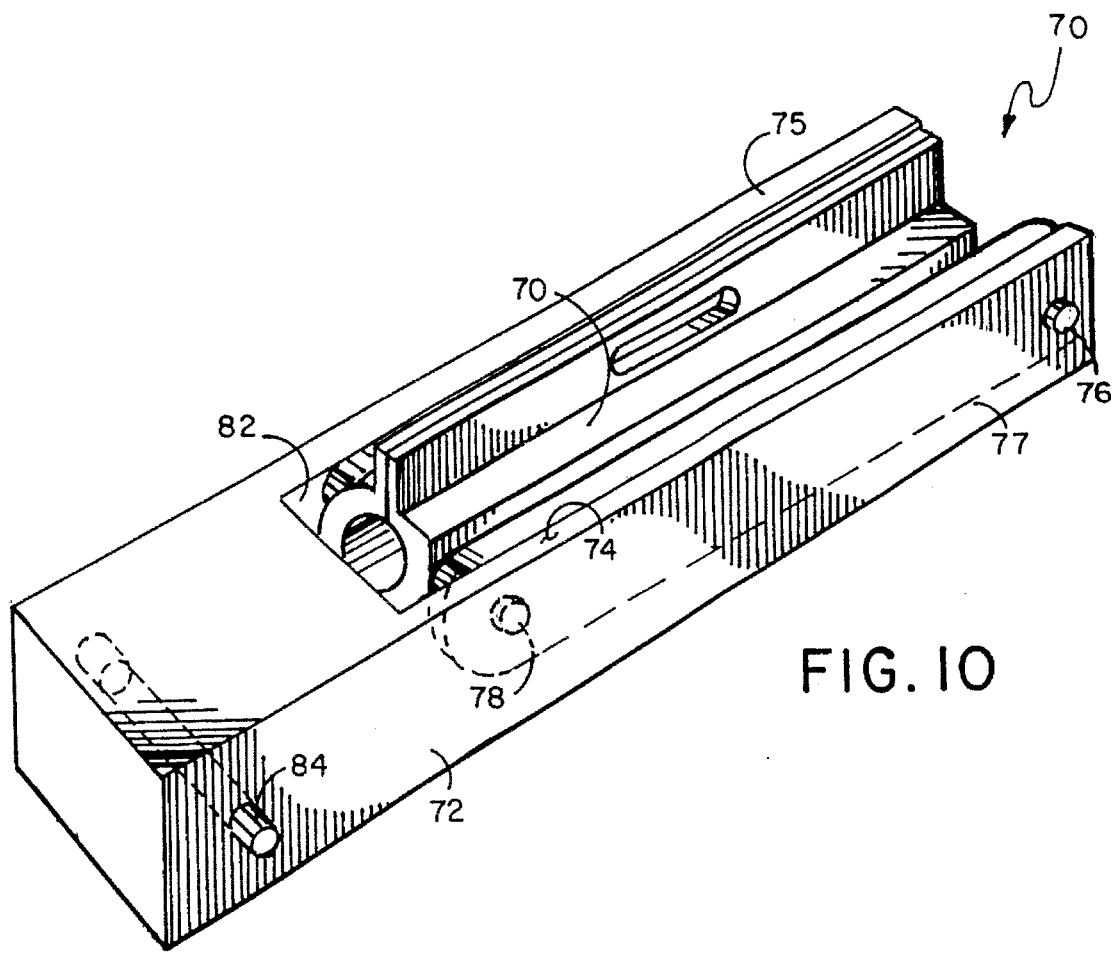
FIG. 10 illustrates a perspective view of an alternate embodiment of the bicycle stand which folds compactly into itself.
Figure 11:
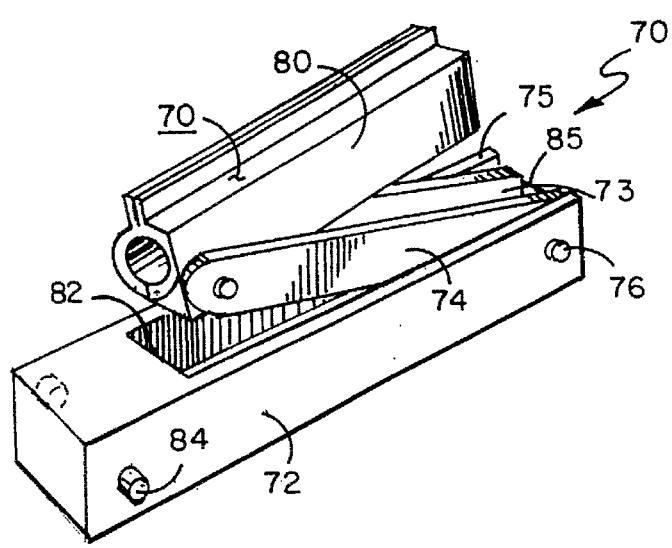
FIG. 11 illustrates a perspective view of the embodiment of FIG. 10 showing the device pivoting inward and outward.

A yet further alternate embodiment of the bicycle stand is seen in FIGS. 10 and 11 which bicycle stand embodiment utilizes a casing having a shorter length than the casings of the previously discussed embodiments. The casing in the ground can be made shorter if locking member 70 folds into first and second extension arms 73 and 74. To accomplish this downsizing of the casing, the following articulative member structure is provided. Arm member 72 has pivot 84 extending therethrough at its first end which engages pivotally into the casing, not seen, but in a manner similar to previously described embodiments. At its second end, arm member 72 has first and second parallel extensions 75 and 77 having an open cavity 82 defined therebetween. Fitting within cavity 82 are first and second extension arms 73 and 74, each having first and second ends and each in parallel alignment with one another, defining an opening 85 therebetween, seen in FIG. 11. First and second extension arms 73 and 74 at their respective first ends are pivotally connected to the second ends of first and second parallel extensions 75 and 77 by pivots 76, only one of which is seen in FIGS. 10 and 11. The second ends of first and second extension arms 73 and 74 are pivotally attached to locking member 70 by extension pivots 78, only one of which is seen in FIGS. 10 and 11. Locking member 70 has the same features as elongated locking portion 50 seen in FIGS. 8 and 9 and is pivotally disposable within opening 82. When pivoted inward, first and second extension arms 73 and 74 can fit within cavity 82 between first and second parallel extensions 75 and 77, and locking member 70 can then pivot into opening 85 defined inbetween first and second extension arms 73 and 74 such that the structure can be contained within a smaller casing when completely folded as seen in FIG. 10.

FIG. 11 shows locking member 70 starting to be extended out from, or inserted between, first and second extension arms 73 and 74.

The bicycle stand of this invention can be utilized in community, institutional, recreational and educational settings. For example, students can be assigned a particular bicycle stand and given a key to that particular bicycle stand in the same manner that school lockers are individually assigned to students. Also such locks could have keys that remain in the locking mechanisms until used, such as with coin-operated storage lockers. Upon deposit of a required coin, the key is removed and the bicycle lock can be locked around the frame of a bicycle. The user then takes the key with him/her until he/she returns and unlocks the locking mechanism at which point the key remains in the locking mechanism for the next user to utilize, with each key associated with each device being different.

The device of this invention can be made of metal, sturdy plastic or equivalent material or combination thereof.

Although the present invention has been described with reference to particular embodiments, it will be apparent to those skilled in the art that variations and modifications can be substituted therefor without departing from the principles and spirit of the invention.

I claim:

1. A bicycle stand for supporting a bicycle above the ground, said bicycle having a frame and a kickstand, comprising:

a casing embedded in said ground;

an articulative member having a first end and a second end, said member pivotally attached at said first end to said casing; and bicycle frame engagement means disposed at said second end of said articulative member, said member having a first and a second mode of use such that when in its first mode said member is pivoted downward to rest within said casing and in its second mode, said member is pivoted upwards from said casing and said bicycle frame engagement means is engaged to a portion of said bicycle frame.

2. The device of claim 1 wherein said articulative member includes a shaft member pivot at said first end of said casing and a bicycle engagement means pivotable at said second end of said articulative member wherein said bicycle frame engagement means includes a lock member, said lock member having a closure member and an engagement member defining a central aperture therebetween, said bicycle frame engagement means openable to be positioned around said bicycle frame.

3. The device of claim 2 wherein said bicycle frame engagement means further includes means to engage said casing to retain said device in position in said casing.

4. The device of claim 1 wherein said articulative member comprises:

an arm having a first end and a second end, said first end pivotally attached to said casing;

first and second arm extensions, each having a first and a second end, said first ends of each connected to said second end of said arm, said first and second arm extensions in parallel alignment with one another defining an open space therebetween;

first and second pivot means disposed, respectively, on said second ends of said first and second arm extension;

an extension member having a first end and a second end, said first end disposed within said open space, said first end pivotally attached to said second ends of said first and second arm extensions;

extension member pivot means disposed at said second end of said extension member; and said bicycle frame engagement means pivotally attached to said extension member pivot means at said second end of said extension member.

5. The device of claim 4 wherein said bicycle frame engagement means comprises:

a first and second elongated side member, each having a length, each side member having a top portion, a central portion and a bottom portion, said top portion and bottom portion meeting each other when said bicycle frame engagement means is in a closed mode and defining an axis along said length;

a cylindrical opening defined in said central portions of said first and second elongated side members along said axis when said bicycle frame engagement means is in a closed mode, said cylindrical opening for receipt of a portion of said bicycle frame;

hinging means disposed along said bottom portion of said first and second elongated side members; and locking means disposed within said top portion of said first and second elongated side members to lock said bicycle frame engagement means to said frame of said bicycle.

6. The device of claim 1 wherein said articulative member comprises:

an arm member having a first end and a second end, said first end pivotally attached to said casing;

first and second parallel extensions disposed in parallel alignment with one another, each having a first end and a second end, said first ends of said first and second parallel extensions extending, respectively, from said second end of said arm member, said first and second parallel extensions defining a cavity therebetween;

first and second pivot means disposed, respectively, at said second ends of said first and second parallel extensions;

first and second extension arms disposed in parallel alignment with one another, said first and second extension arms each having a first end and a second end, said first ends pivotally attached, respectively, to said first and second pivot means disposed on said first and second parallel extensions, said first and second extension arms defining an opening therebetween;

first and second extension arm pivots disposed, respectively, at said second ends of said first and second extension arms; and said bicycle frame engagement means pivotally attached to said first and second extension arm pivots and of a size to be disposed within said opening between said first and second extension arms.

7. The device of claim 6 wherein said bicycle frame engagement means comprises:

a first and second elongated side member, each having a length, each side member having a top portion, a central portion and a bottom portion, said top portion and bottom portion meeting each other when said bicycle frame engagement means is in a closed mode and defining an axis along said length;

a cylindrical opening defined in said central portions of said first and second elongated side members along said axis when said bicycle frame engagement means is in a closed mode, said cylindrical opening for receipt of a portion of said bicycle frame;

hinging means disposed along said bottom portion of said first and second elongated side members; and locking means disposed within said top portion of said first and second elongated side members to lock said bicycle frame engagement means to said frame of said bicycle.

8. A bicycle stand for the upright storage above the ground of a bicycle having a frame, comprising:

a casing disposed in said ground having at least one cavity defined therein, said cavity having a first end and a second end;

a first pivot member disposed at said first end of said cavity;

an elongated shaft member having a first end and a second end, said shaft member attached to said casing by said first pivot member at said first end of said casing, said casing cavity being of a size and shape to closely receive said shaft member therein;

a second pivot member disposed at the second end of said shaft member;

a closure member having a first end and a second end, said first end of said closure member attached to said second pivot member;

a third pivot member disposed on said closure member;

an engagement member having a first end and a second end, said engagement member affixed at its first end to said third pivot member on said closure member, said engagement member and said closure member defining an open area therebetween to receive a portion of said frame of said bicycle;

engagement means disposed at said second end of said engagement member to engage said closure member; and locking means to lock said engagement means to said closure member.

9. The device of claim 8 further including means to lock said device to said casing.

* * * * *